(12) United States Patent  (10) Patent No.: US 9,418,009 B2
Moga et al.  (45) Date of Patent: Aug. 16, 2016

(54) INCLUSIVE AND NON-INCLUSIVE TRACKING OF LOCAL CACHE LINES TO AVOID NEAR MEMORY READS ON CACHE LINE MEMORY WRITES INTO A TWO LEVEL SYSTEM MEMORY

(71) Applicant: Intel Corporation, Santa Clara, CA (US)

(72) Inventors: Adrian C. Moga, Portland, OR (US); Vedaraman Geetha, Fremont, CA (US); Bahaa Fahim, San Jose, CA (US); Robert G. Blankenship, Tacoma, WA (US); Yen-Cheng Liu, Portland, OR (US); Jeffrey D. Chamberlain, Tracy, CA (US); Stephen R. Van Doren, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 234 days.

(21) Appl. No.: 14/142,045

(22) Filed: Dec. 27, 2013

(65) Prior Publication Data

US 2015/0186275 A1 Jul. 2, 2015

(51) Int. Cl.
*G06F 12/00* (2006.01)
*G06F 13/00* (2006.01)
*G06F 13/28* (2006.01)
*G06F 12/08* (2016.01)

(52) U.S. Cl.
CPC ........ *G06F 12/0811* (2013.01); *G06F 12/0888* (2013.01)

(58) Field of Classification Search
CPC .................................................. G06F 12/0811
See application file for complete search history.

(56) References Cited

U.S. PATENT DOCUMENTS

| | | | | | |
|---|---|---|---|---|---|
| 4,141,068 | A | * | 2/1979 | Mager | G06F 8/66 711/103 |
| 5,313,602 | A | * | 5/1994 | Nakamura | G06F 12/0879 711/100 |
| 5,564,035 | A | * | 10/1996 | Lai | G06F 12/0897 711/122 |
| 5,787,478 | A | * | 7/1998 | Hicks | G06F 12/0811 711/122 |

(Continued)

OTHER PUBLICATIONS

Near-memory Caching for Improved Energy Consumption; AbouGhazaleh et al; Proceedings 2005 IEEE International Conference on Computer Design: VLSI in Computers and Processors; Oct. 2-5, 2005; p. 105-108 (4 pages).*

(Continued)

*Primary Examiner* — Sanjiv Shah
*Assistant Examiner* — Daniel C Chappell
(74) *Attorney, Agent, or Firm* — Nicholson De Vos Webster & Elliot, LLP

(57) ABSTRACT

A processor may include a memory controller to interface with a system memory having a near memory and a far memory. The processor may include logic circuitry to cause memory controller to determine whether a write request is generated remotely or locally, and when the write request is generated remotely to instruct the memory controller to perform a read of near memory before performing a write, when the write request is generated locally and a cache line targeted by the write request is in the inclusive state to instruct the memory controller to perform the write without performing a read of near memory, and when the write request is generated locally and the cache line targeted by the write request is in the non-inclusive state to instruct the memory controller to read near memory before performing the write.

21 Claims, 4 Drawing Sheets

(56) References Cited

U.S. PATENT DOCUMENTS

| | | | | |
|---|---|---|---|---|
| 5,796,980 A * | 8/1998 | Bowles | G06F 12/0811 | 711/144 |
| 5,909,697 A * | 6/1999 | Hayes | G06F 12/0831 | 711/122 |
| 5,963,978 A * | 10/1999 | Feiste | G06F 12/0811 | 710/39 |
| 6,073,212 A * | 6/2000 | Hayes | G06F 12/0811 | 711/122 |
| 6,115,794 A * | 9/2000 | Arimilli | G06F 12/0811 | 711/122 |
| 6,321,296 B1 * | 11/2001 | Pescatore | G06F 12/0811 | 711/117 |
| 6,321,305 B1 * | 11/2001 | Arimilli | G06F 12/0804 | 711/122 |
| 6,385,702 B1 * | 5/2002 | Arimilli | G06F 12/0831 | 711/122 |
| 6,463,507 B1 * | 10/2002 | Arimilli | G06F 12/0811 | 711/122 |
| 6,477,620 B1 * | 11/2002 | Bauman | G06F 12/0811 | 711/118 |
| 6,662,275 B2 * | 12/2003 | Arimilli | G06F 12/0848 | 711/122 |
| 6,826,655 B2 * | 11/2004 | Arimilli | G06F 12/0811 | 711/122 |
| 7,133,975 B1 * | 11/2006 | Isaac | G06F 12/0811 | 711/141 |
| 7,469,318 B2 * | 12/2008 | Chung | G06F 12/0811 | 711/119 |
| 7,552,288 B2 * | 6/2009 | Iyer | G06F 12/0811 | 711/122 |
| 7,805,575 B1 * | 9/2010 | Agarwal | G06F 12/0811 | 711/141 |
| 8,024,527 B2 * | 9/2011 | Arimilli | G06F 9/30043 | 711/146 |
| 8,131,935 B2 * | 3/2012 | Arimilli | G06F 12/0811 | 709/212 |
| 8,738,860 B1 * | 5/2014 | Griffin | G06F 12/0897 | 711/122 |
| 9,058,269 B2 * | 6/2015 | Krick | G06F 12/0811 | |
| 9,146,869 B2 * | 9/2015 | Krick | G06F 12/0811 | |
| 9,250,914 B2 * | 2/2016 | Hughes | G06F 9/3806 | |
| 9,251,070 B2 * | 2/2016 | Cho | G06F 12/0811 | |
| 9,274,960 B2 * | 3/2016 | Kaxiras | G06F 12/0815 | |
| 9,286,220 B2 * | 3/2016 | Hollaway, Jr. | G06F 12/0811 | |
| 2002/0174304 A1 * | 11/2002 | Wang | G06F 12/0897 | 711/144 |
| 2006/0218352 A1 * | 9/2006 | Shannon | G06F 12/0811 | 711/136 |
| 2007/0186045 A1 * | 8/2007 | Shannon | G06F 12/128 | 711/133 |
| 2008/0209133 A1 * | 8/2008 | Ozer | G06F 12/0822 | 711/146 |
| 2009/0019306 A1 * | 1/2009 | Hum | G06F 11/1064 | 714/2 |
| 2012/0159073 A1 * | 6/2012 | Jaleel | G06F 12/128 | 711/122 |
| 2013/0311722 A1 * | 11/2013 | Arelakis | H03M 7/40 | 711/122 |
| 2014/0040551 A1 * | 2/2014 | Blainey | G06F 12/0833 | 711/122 |
| 2015/0006805 A1 * | 1/2015 | Feekes | G06F 3/0604 | 711/105 |
| 2015/0143047 A1 * | 5/2015 | Hagersten | G06F 12/0891 | 711/122 |

OTHER PUBLICATIONS

Non-Inclusion Property in Multi-level Caches Revisited; Zahran et al; IJCA, vol. 14, No. 2; Jun. 2007; retrieved from http://web.cecs.pdx.edu/~herb/ece587s15/Papers/02_zahran_cache_2007.pdf on Oct. 12, 2015 (10 pages).*

* cited by examiner

INCLUSIVE AND NON-INCLUSIVE TRACKING OF LOCAL CACHE LINES TO AVOID NEAR MEMORY READS ON CACHE LINE MEMORY WRITES INTO A TWO LEVEL SYSTEM MEMORY

FIELD OF INVENTION

The field of invention pertains to computing systems generally, and, more specifically, to inclusive/non inclusive tracking of local cache lines to avoid near memory reads on cache line memory writes into a two level system memory.

BACKGROUND

New computing system paradigms are being considered as power consumption in the face of ever increasing clock speeds becomes a larger concern. One of these new paradigms attempts to lower the power consumption of system memory which has traditionally been implemented with dynamic random access memory (DRAM) technology. DRAM technology is based on storing charge in capacitive cells that need continuous refreshment. The continuous refreshment, combined with higher clock speeds and denser cell packing densities has caused DRAM based system memories to become potentially too power hungry. DRAM technology still has superior (i.e., lower) access times as compared to other competing storage technologies, however.

A new paradigm, observed in FIG. 1, has emerged that uses two different types of memory technology within the system memory 103 of a computing system 100. Under this new paradigm system memory 103 is viewed as having two components: "near memory" 101 and "far memory" 102. Near memory 101 is composed of faster DRAM but acts as a caching layer for far memory 102. Far memory 102 may be implemented, for instance, with non volatile phase change memory (e.g., phase change memory and switch (PCMS)) that, although slower than DRAM, can be denser and consumes less power than DRAM. As such, system memory 103 as a whole has the potential to have more storage and consume less power because of the use of denser, less power hungry phase change technology for far memory 102. The penalty of using slower phase change technology is compensated for at least somewhat by using a (e.g., thin) layer of DRAM in near memory 101 as a caching layer for far memory 102. Here, if more frequently used information is kept in DRAM the access times of reaching such information will be improved.

The use of a near memory and far memory concept in system memory creates new opportunities for system wide speed-ups.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
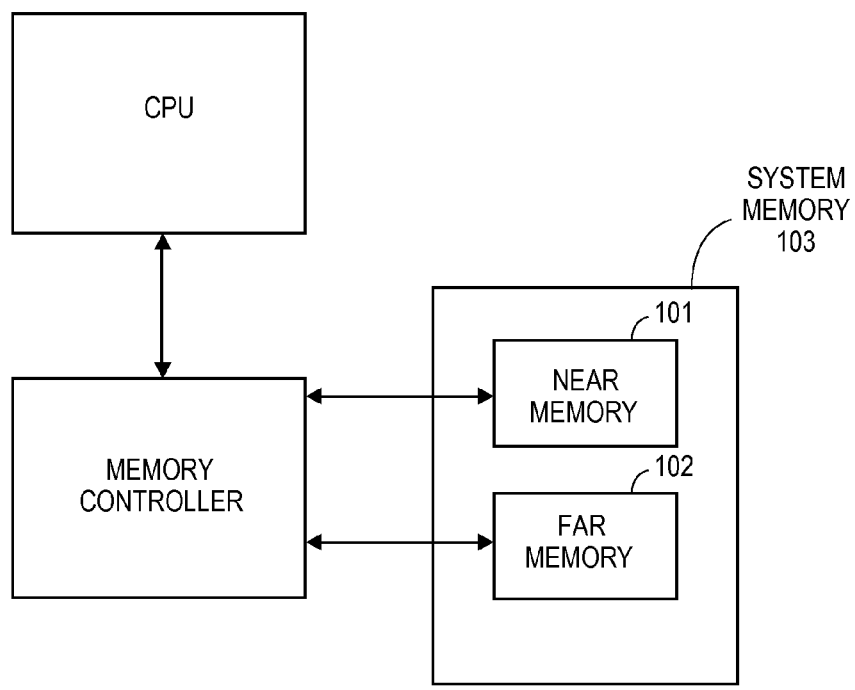
FIG. 1 (prior art) shows a two level system memory.
Figure 2:
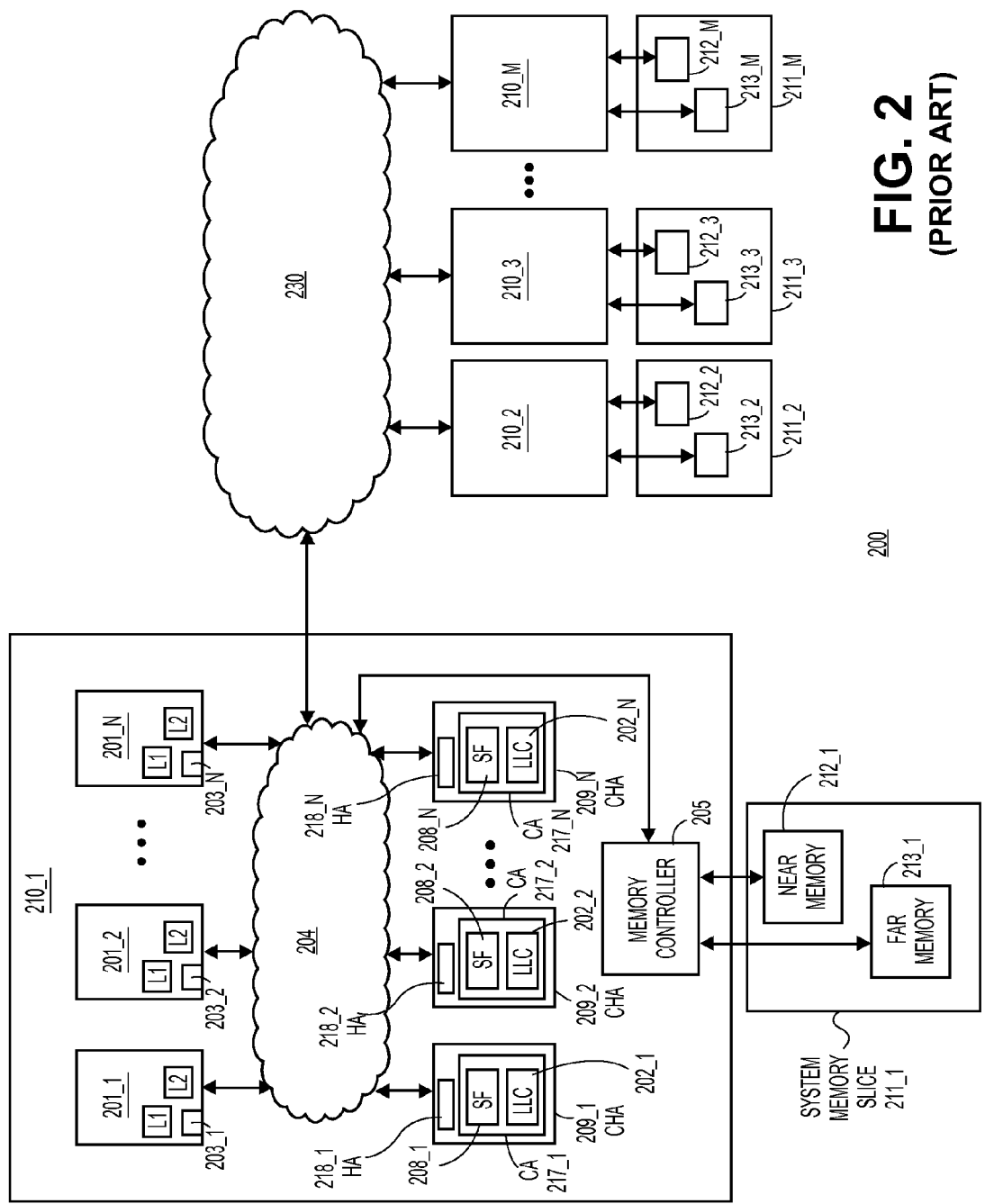
FIG. 2 (prior art) shows a computing system implemented with multi-core processors and a two level system memory.

FIG. 2 shows a multicore processor 210_1 that is part of a larger multiprocessor computing system 200. As observed in FIG. 2, the multicore processor 210_1 includes a plurality of processing cores 201_1 through 201_N interconnected to a set of distributed cache home agents (CHAs) 209_1 through 209_N. As observed in FIG. 2, each CHA instance 209_1 through 209_N is composed of a slice of last level cache (LLC) instance 202_1 through 202_N and snoop filters 208_1 through 208_N. The LLC instances 202 and snoop filter instances 208 are components of respective caching agents (CA) 217_1 through 217_N. Each of the caching agents 217_1 through 217_N is integrated with a respective home agent (HA) 218_1 through 218_N to form a respective CHA 209_1 through 209_N. The CA is responsible for local coherence and the CPU side cache interface, and the HA is responsible for global coherence and the system memory interface.

Each LLC instance 202_1 through 202_N is responsible for acting as a last level cache of the processor 200 for a "slice" of system memory addresses (for simplicity the number of CHA and LLC slices is depicted as being the same as the number of cores but alternative designs may have them unequal). Which particular system memory addresses map to which LLC instance is determined by a hashing function 203_1 through 203_N within each processing core 201_1 through 201_N. In operation when a processing core needs to evict a cache line from its own internal L2 cache or read a cache line that is not found in its L2 cache, the processing core hashes the address of the desired cache line. The output of the hashing function identifies which LLC the cache line request is to be directed to. The processing core then directs the cache line request to the correct CHA via interconnection network 204.

The respective snoop filters 208_1 through 208_N of the distributed CHA track the MESI states of the cache lines having system memory addresses that hash to its resident CHA and are cached in an L1 or L2 cache. For example, snoop filter 208_1 keeps a table that tracks the MESI states of the cache lines that are cached in any L1 or L2 caches of the above processing cores 201_1 through 201_N but that would hash to CHA 209_1 if evicted. Thus the collection of snoop filters 208_1 through 208_N are able to track the MESI states of all the cache lines in the L1 and L2 caches of the above processing cores 201_1 through 201_N.

As the overall computing system 200 contains multiple multicore processors 210_1 through 210_M, each multicore processor has its own associated system memory component 211_1 through 211_M. Like the last level caching approach, each system memory component 211_1 through 211_M is responsible for its own "slice" of system memory addresses. For example, when a cache line is evicted from an LLC instance, the "caching agent" function associated with the LLC instance's CHA determines which system memory slice the cache line should be directed to. Similarly, when a core issues a read that is not found in the snoop filter or LLC of the CHA targeted by the read, the CA associated with the CHA targeted by the read will determine which system memory slice the cache line should be directed to.

For any cache line accessed by processor 210_1, if the cache line is to be directed to the "local" system memory component 211_1, the cache line is directed to the local memory controller 205 through the "home agent" functionality of the CHA. If the cache line is to be directed to a remote system memory component 211_2 through 211_M, the cache line is directed to a remote processor. For example, if a cache line that is evicted from LLC instance 202_1 is be stored in the local system memory component 211_1, the cache line is sent through the internal interconnection network 204 to memory controller 205. By contrast, if the cache line is to be directed to one of the remote system memory components 211_2 through 211_M, the cache line is directed to one of the remote processors 210_2 through 210_M through the internal interconnect network 204 to the external interconnect network 230 for storage in the remote processor's local system memory component.

As observed in FIG. 2, the system memory components 211_1 through 211_M each include a respective near memory component 212_1 through 212_M and a respective far memory component 213_1 through 213_M. Each near memory component 212_1 through 212_M acts as a local cache for its respective far memory component 213_1 through 213_M. In an implementation, the near memory 212_1 is a direct mapped cache. In the case of a direct mapped cache, a set of addresses map to a single entry in near memory (the location being determinable from the addresses themselves). Thus, in a sense, more than one system memory address will "fight" for use of a same near memory entry.

In operation, for any read or write request, the memory controller 205 will perform a read into near memory to see if the cache line to which the request pertains is cached there. If so (near memory cache hit), the memory controller 205 performs the requested operation and keeps the cache line in near memory 212_1. In the case of a read, a copy of the requested cache line is sent to the requestor and the cache line is not written over in near memory (i.e., is kept there). In the case of a write the new data for the cache line that was received in the request is written over the old cache line in near memory.

If the requested cache line is not found in near memory (near memory cache miss), in the case of a read, the controller 205 reads the cache line from far memory 213_1, sends a copy of the cache line to the requestor and writes the cache line into near memory 212_1. In the case of a write when the requested cache line is not found in near memory 212_1, the controller 205 simply writes the cache line that was received with the request into far memory 213_1. No copy is placed in near memory 212_1. Thus, if there is no "hit" in near memory, a read will evict the cache line in near memory but a write will not evict the cache line in near memory.

When it is possible that a copy of a writable cache line (e.g., a cache line in the M or E state) within one of the caches of the system 200 might not exist in the near memory of its system memory slice, the system is said to be operating in a "non inclusive" mode. Here, "non inclusive" mode requires a read into near memory for any write operation to system memory, even for cache lines in the M or E state in a processor cache, because it is not known whether or not a copy of the cache line resides in near memory. This lack of knowledge reproduces as system inefficiency.

Another mode of operation, referred to as "inclusive" guarantees that a writable cache line in any processor caching level_will be kept in near memory 212_1. This means, for instance, if an M or E cache line is cached within a processor, a copy or older version of the cache line for the same system memory address is also kept in near memory 212_1. For simplicity the remainder of the document will refer mainly to copies. Thus if an M/E cache line in a processor cache is written back, the written back cache line is directly written into near memory 212_1 by controller 205. No read of near memory 212_1 needs to be performed beforehand.

Cache lines can and will be evicted from near memory 212_1, however. For example, if a read request is received by controller 205 for a cache line having a different system memory address than the address of a cache line in near memory having a sibling in an M/E state in a system level cache but that still maps to the same location in near memory 212_1, a near memory cache miss will result. The cache line in near memory 212_1 will be evicted from near memory 212_1 and written further back to far memory 213_1 if the line is modified in NM. The requested cache line will be read from far memory 213_1 and forwarded to the requestor. The requested cache line will also be written into near memory 212_1 as discussed above (as discussed above, a read on a near memory miss will evict the near memory cache line).

Thus the problem exists that a cache line in near memory 212_1 having a sibling cache line in the M or E state in a system level cache can be evicted from near memory 212_1 in violation of the "inclusive" guarantee that any such cache line has a copy of itself in near memory 212_1. In order to handle this problem, the controller 205 and the processors 210_1 through 210_M are designed to "back-invalidate" any such sibling cache line in a system level cache from its M or E state to an S state. Thus, for example, if a cache line in the M or E state is cached in a system cache and its version in near memory 212_1 is evicted, the state of the cache line in the system cache is changed (e.g., at its associated snoop filter) from M or E to S. The S state is a non-writable state. Thus, with the cache line in the system cache having been changed to the S state, there is no longer any need to guarantee that it has a copy in near memory. Thus the eviction of the cache line's copy from near memory 212_1 no longer violates the inclusive mode guarantee. Here, the back invalidation process must be confirmed as complete before controller 205 is free to evict the cache line from near memory 212_1.

The back invalidation process itself, however, is inefficient because it necessitates traffic from/to controller 205 to/from the processor where the cache line in the M or E state resides. It also requires any modified lines in system cache to be written back to memory before being changed to the S state. It does not allow further modification to the cache line without requesting exclusive access to the cache line which usually requires a request to the memory controller. In multi-processor systems, it may also require traffic on the external interconnect which is even more expensive and deadlock prone.

Figure 3:
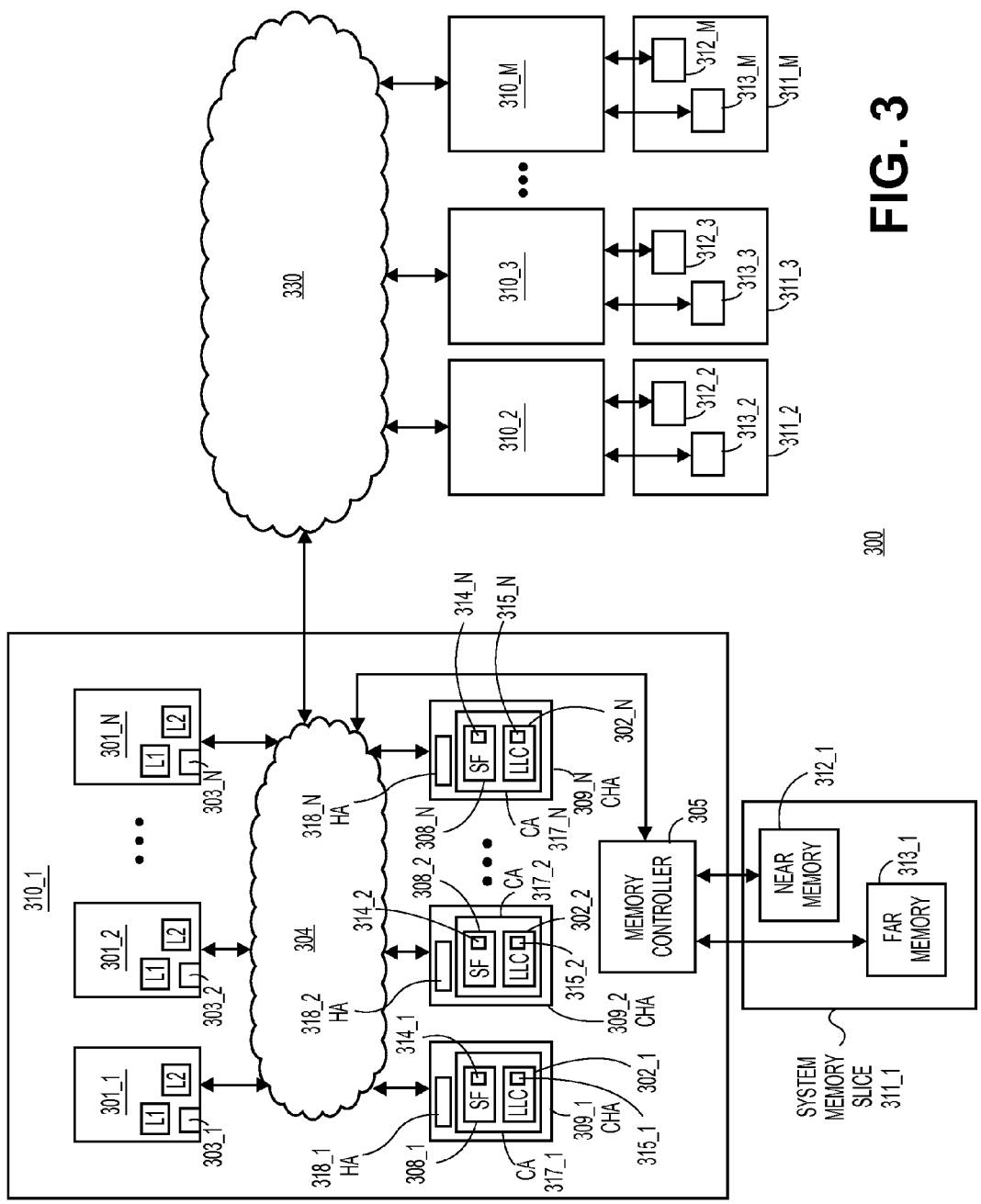
FIG. 3 shows an improved computing system implemented with multi-core processors and a two level system memory.

FIG. 3 therefore pertains to another approach that does not require back invalidation and maintains an inclusive mode at least for system memory addresses that map to a local system memory slice (i.e., can maintain a "local inclusive" state) for lines accessed by local cores. The approach of FIG. 3 essentially designs into the CHA instances 309_1 through 309_M a full view perspective, at least for local memory accesses, of the happenings between controller 305 and near memory 312_1.

With the CHA instances 309_1 through 309_M having a full view of the happenings before their local near memory 312_1, the CHA instances 309_1 through 309_M can detect when a cache line in the M/E state that is cached within the processor 310_1 has its copy in near memory evicted (e.g., by a read of a cache line having a different system memory address that maps to the same entry in near memory where the copy is kept) and thereby removing any "inclusive" property of the near memory for that cache line. With knowledge as to whether near memory 312_1 is behaving "non-inclusively" or "inclusively" for its own cache lines, the CHA instances 309_1 through 309_M can indicate to controller 305, as part of any write requests issued to controller 305, whether the controller 305 needs to perform a read of near memory 312_1 or does not need to perform a read of near memory 312_1 before writing the cache line into system memory 311_1.

In an embodiment, in order to provide each CHA instance 309_1 through 309_M with a full view of the happenings at its local near memory 312_1 for its own cache lines, the hashing functions of the processors 303_1 through 303_M are modified so that cache lines whose system memory addresses map to a same entry in near memory 312_1 will also map to the same CHA instance. Said another way, a correlation is put in place between system memory address, near memory entry and CHA instance. By so doing, a same CHA instance will process all cache requests that pertain to a same entry in near memory 312_1.

With this capability, a CHA instance can detect when a read request has been issued for a cache line having a system memory address that maps to the same near memory entry holding a cache line with a different system memory address having an M/E sibling in the local cache of processor 310_1 where the memory is resident (home processor). That is, a CHA instance can detect when a cache line in near memory 312_1 that is acting "inclusively" is evicted such that the sibling M/E cache line in the processor cache experiences a change in state from having an "inclusive" near memory (copy of itself in near memory) to having an "exclusive" near memory (no copy of itself in near memory). With knowledge of the inclusive/exclusive state of the processor's internally cached M/E cache lines, each CHA instance when issuing a write request for one of its cache lines to controller 305 (e.g., as part of a write back process of a write back memory system) can indicate in the request whether controller 305 can perform the write into near memory 312_1 directly and without first reading near memory 312_1 to confirm there is a cache hit.

As observed in FIG. 3, each CHA instance includes a respective LLC instance 309_1 through 309_N and a snoop filter instance 308_1 through 308_N. Each LLC instance contains the cache lines for its CHA's respective system memory address slice that are cached in the processor's LLC. Each such cache line has state information that identifies which of the cache coherence protocol (e.g., MESI) states the cache line is presently in. The snoop filter contains a table that identifies the MESI state for each of the cache lines having the CHA's respective system memory address that are cached in a caching level higher than the LLC (e.g., L1 and L2 caches). By extending the state information kept for the cache lines that are cached in the LLC and likewise extending the state information kept for the cache lines represented in the snoop filter table to further include additional state information 314_1 through 314_N, 315_1 through 315_N that indicates whether they have an inclusive copy in the local near memory ("inclusive" state) or not ("non inclusive" state), near memory reads can be selectively avoided for writes to system memory for cache lines that are recognized as being in an inclusive state. Likewise, near memory reads can be selectively performed for writes to system memory for cache line writes that are recognized as being in a non exclusive state. The "inclusive/non inclusive" additional information 315_1 through 315_N kept in the cache lines of the LLC instances 302_1 through 302_N and the "inclusive/non inclusive" additional information 314_1 through 314_N kept in the snoop filter instances 308_1 through 308_N may be implemented with a single bit.

Figure 4:
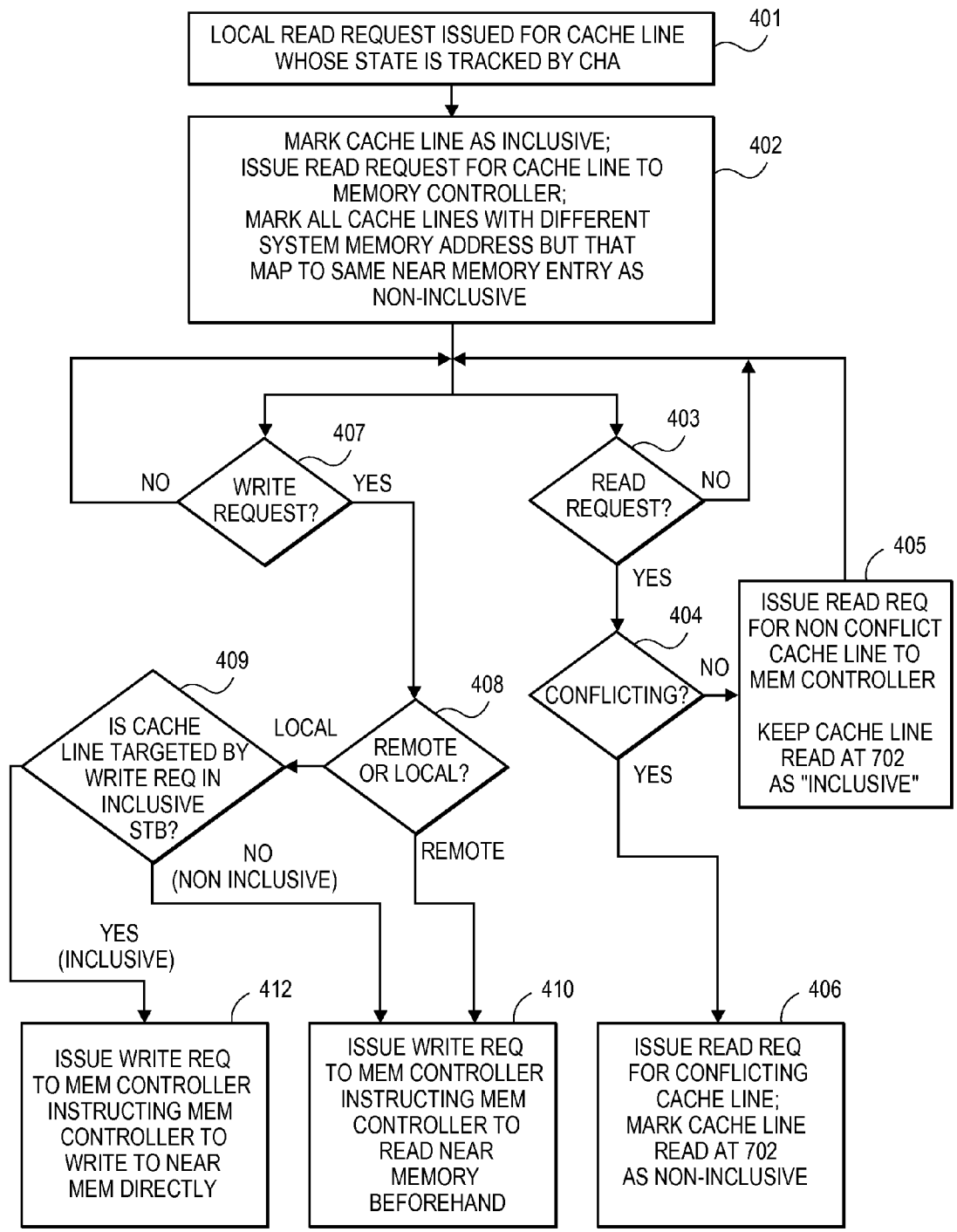
FIG. 4 shows a methodology performed by a CHA of the system of FIG. 3.

FIG. 4 provides a flow diagram that describes how the "inclusive"/"non inclusive" state is tracked for each cache line tracked by a CHA. The flow diagrams hold whether the cache line is cached in the LLC or in a higher level of cache. As observed in FIG. 4, if a CHA recognizes that a locally generated read request is issued 401 to local system memory for one of its cache lines the CHA marks the state of the cache line as "inclusive" and marks the state of any cache lines with different system memory address that map locally to the same near memory entry as "non inclusive" 402. This state transition essentially recognizes that a cache line that is read from system memory will be cached in near memory as part of the system memory read transaction.

As is understood in the art, when a cache line is read from system memory it enters the processor caching system in the E state (if it is not already marked as shared in memory, or if the appropriate action has been taken to invalidate copies in other CPU caches). It may be written to (modified) within a processor cache and change to the M state. So long as no other read requests are issued, whether generated internally on the processor or received externally from a remote processor, for a different system memory address that maps to the same near memory entry that is holding the cache line read at 401, the cache line remains in the inclusive state. Notably, remote requests issued from remote processors that target the processor's local memory are passed before the CHA. Therefore the CHA can detect locally generated as well as remotely generated read requests that would conflict with the cache line read at 402.

If a new read request 403 is received at the CHA but the address of the new read request is non conflicting 404 (i.e., it is the same address as the cache line read at 402 or is a different address but does not map to the same near memory entry as the cache line read at 402), a new read request is generated 405 for the cache line that was read in 402. Here, the memory controller simply performs a standard read which includes an initial read of near memory. In this case, if the address is the same as the cache line read at 402, there will be a cache hit at near memory and the requested cached line is forwarded to the requestor and remains in near memory. If the address is different but does not map to the same near memory entry, the cache line read at 402 will remain in near memory. In either case, the cache line read at 402 remains in near memory and, therefore, the state of the cache line read at 402 is kept in the "inclusive" state. In an embodiment, all read requests perform an initial read of near memory.

Should the CHA detect any new read requests that conflict with the cache line read at 402 (the address of the new read request is different but maps to the same near memory entry as the cache line read at 402), a read request for the new cache line is directed to the memory controller and the state of the cache line read at 402 is changed to non inclusive 406 (because the new read will evict the cache line read at 401 from near memory). If the new conflicting read request was locally generated (generated from the CHA's own processor) the CHA marks the state of the newly read cache line as inclusive. In this case, the process flow for the new cache line can be recognized as having just passed through processes 401 and 402 on its own accord. If the new conflicting read was remotely generated the CHA does not have visibility into this newly read cache line's treatment at the remote processor and therefore does not cache it nor track it. Therefore the CHA does not keep any state for it.

Again, in an embodiment, all read requests to system memory first perform a read of near memory. As such, in the case of a new conflicting read request 403, 404, the cache line initially read at 402 will be read from near memory and evicted to far memory (because the conflicting read request reproduces as a near memory cache miss).

Considering write requests 407, if the CHA becomes aware of any write requests after the initial cache line was read at 402, the CHA first inquires whether the write request was generated remotely or locally 408. If the write request was generated remotely, a write request is issued to the memory controller that instructs the memory controller to perform a read of near memory beforehand 410. If the write request was generated locally and the cache line targeted by the write request (which may or may not be the cache line read at 402)

is in the inclusive state 409, the CHA instructs the memory controller to directly write the cache line into near memory without performing a read of near memory beforehand. 412. By contrast, if the write request was generated locally and the cache line targeted by the write request (which may or may not be the cache line read at 402) is in the non inclusive state 409, the CHA instructs the memory controller to read near memory before performing the actual write into system memory.

In various implementations the memory controller described above may be implemented with multiple components. For example a "processor-side" portion of the memory controller may exist on the processor and receive requests from the CHA as described above. A "memory side" portion of the memory controller may exist external to the processor (e.g., on a DIMM card on which both near memory and far memory components are placed). This memory side portion may include hit/miss logic circuitry and perform the hit/miss activity associated with near memory reads. In this type of implementation, whether or not a near memory read is to be performed with a write operation is communicated from the CHA to the processor side memory controller, and then from the processor-side of the memory controller to the memory-side of the memory controller. As such, the memory-side component may include logic circuitry to detect whether a write request is indicating if a read of near memory is to performed for the write transaction or if the write operation can be performed directly into near memory without a read of near memory beforehand.

Conceivably, rather than use the inclusive/non inclusive extended state information as discussed at length above, a near memory tag cache can be kept on the processor so that the processor can detect which cache lines are in near memory and issue write requests to the memory controller that skip the near memory read when the processor detects that a version or copy of the cache line targeted by a write request resides within near memory.

It is also pertinent to point out that although FIGS. 2 and 3 emphasized the use of a distributed last level cache and distributed snoop filter instances, a centralized last level caching system and snoop filter function could just as readily employ the teachings of the instant application. Here, a centralized last level caching system may not need to integrate hashing functions into the processing cores that target a specific slice based on address for any outgoing caching activity.

The various features of the CHA and memory controller discussed above may be implemented, e.g., with logic circuitry such as dedicated logic circuits designed into a semiconductor chip. Some or all of the logic circuits may be programmable. The CHA may additionally include state keeping circuits, such as registers and/or memory cells to keep various state information such as the MESI states and inclusive, non inclusive states of the various cache lines. The CHA's functions may also be wholly or partially implemented with program code of some kind. For example, some or all features of the CHA discussed above may be implemented with a microcontroller or other logic circuitry that is designed to execute program code (e.g., firmware). As such various methods described above may be implemented in program code that is stored on a tangible machine readable medium. An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The above description describes a processor that includes: one or more processing cores; a memory controller to interface with a system memory having a near memory and a far memory; a plurality of caching levels above the memory controller; logic circuitry to track state information of a cache line that is cached in one of the caching levels, the state information including a selected one of an inclusive state and a non inclusive state, the inclusive state indicating that a copy or version of the cache line exists in near memory, the non inclusive state indicating that a copy or version of the cache line does not exist in the near memory, the logic circuitry to cause the memory controller to handle a write request that requests a direct write into the near memory without a read of the near memory beforehand if a system memory write request generated within the processor targets the cache line when the cache line is in the inclusive state.

In an embodiment the logic circuitry is part of a cache home agent. In an embodiment the cache home agent includes snoop filter circuitry to track inclusive/non inclusive state information of cache lines cached above a last caching level of the processor. In an embodiment the cache home agent includes a last caching level of the processor. In an embodiment the plurality of caching levels include a distributed last caching level, SF, and CHA. In an embodiment the processing cores include respective hashing functions designed to direct all system memory addresses that map to a same near memory entry to a same last level cache slice. In an embodiment the logic circuitry is to identify when a read request for a cache line having a system memory address that is different than the cache line but that still maps to same near memory entry where a copy or version of the cache line resides, and, if the cache line is in an inclusive state, change the cache line's state to non inclusive in response. In an embodiment the logic circuitry marks all other cached cache lines that map to the near memory entry as non inclusive. In an embodiment the logic circuitry is to cause the memory controller to handle a write request that requests that a read of near memory be performed in response to the processor receiving a remotely generated write request.

The above discussion describes a method including: instructing a memory controller of a processor to read a cache line from a system memory having a near memory component and a far memory component; entering the cache line in a cache of the processor; having an option of choosing one of an inclusive state and a non inclusive state, marking the cache line as having the inclusive state; recognizing that a write request generated on the processor for the cache line has targeted system memory; in response to the combination of the cache line having an inclusive state and the recognizing of the write request, instructing the memory controller to satisfy the write request by performing a direct write into near memory without a read of the near memory beforehand.

In an embodiment the method further includes recognizing that a read request for a second cache line has targeted the system memory, recognizing that the second cache line has a system memory address that is different than the cache line's system memory address, and recognizing that the system memory address of the second cache line maps to a same entry in the near memory where a copy or version of the cache line resides, and changing the state of the cache line to a non inclusive state in response. In an embodiment the method further includes marking the second cache line as having an inclusive state. In an embodiment the method further includes marking all other cache lines that are cached in the processor and have a system memory address that maps to the same entry as having a non inclusive state. In an embodiment the method further includes recognizing that a second read request for the cache line has targeted the system memory, and keeping the state of the cache line inclusive in response. In an embodiment the method further includes receiving a remotely generated write request at the processor and instructing the memory controller to satisfy the remotely generated write request by performing a read of near memory before performing a write into the system memory.

The above discussion describes a computing system including: a) a system memory having a near memory and a far memory; b) a processor, including: one or more processing cores; a memory controller to interface with the system memory; a plurality of caching levels above the memory controller; logic circuitry to track state information of a cache line that is cached in one of the caching levels, the state information including a selected one of an inclusive state and a non inclusive state, the inclusive state indicating that a copy or version of the cache line exists in near memory, the non inclusive state indicating that a copy or version of the cache line does not exist in the near memory, the logic circuitry to cause the memory controller to handle a write request that requests a direct write into the near memory without a read of the near memory beforehand if a system memory write request generated within the processor targets the cache line when the cache line is in the inclusive state.

In an embodiment the plurality of caching levels include a distributed last caching level and wherein the processing cores include respective hashing functions designed to direct all system memory addresses that map to a same near memory entry to a same last level cache slice. In an embodiment the logic circuitry is to identify when a read request for the cache line having a system memory address that is different than the cache line but that still maps to same near memory entry where a copy or version of the cache line resides, and, if the cache line is in an inclusive state, change the cache line's state to non inclusive in response. In an embodiment the logic circuitry marks all other cached cache lines that map to the near memory entry as non inclusive. In an embodiment the logic circuitry is to cause the memory controller to handle a write request that requests that a read of near memory be performed in response to the processor receiving a remotely generated write request.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A processor comprising:
   one or more processing cores;
   a memory controller to interface with a system memory having a near memory and a far memory; and
   logic circuitry to track state information of a cache line, said state information including a selected one of an inclusive state and a non-inclusive state, said inclusive state indicating that a copy of said cache line exists in near memory, said non-inclusive state indicating that a copy of said cache line does not exist in said near memory, said logic circuitry to cause said memory controller to determine whether a write request is generated remotely or generated locally, and
   when the write request is generated remotely, to instruct the memory controller to perform a read of the near memory before performing a write to a cache line targeted by the write request,
   when the write request is generated locally and the cache line targeted by the write request is in the inclusive state, to instruct the memory controller to perform a write to the cache line targeted by the write request without performing a read of the near memory, and
   when the write request is generated locally and the cache line targeted by the write request is in the non-inclusive state, to instruct the memory controller to perform a read of the near memory before performing a write to the cache line targeted by the write request.

2. The processor of claim 1 further comprising a plurality of caching levels above the memory controller, and wherein said logic circuitry is part of a cache home agent.

3. The processor of claim 2 wherein said cache home agent includes snoop filter circuitry to track inclusive and non-inclusive state information of cache lines cached above a last caching level of said processor.

4. The processor of claim 3 wherein said cache home agent includes a last caching level of said processor.

5. The processor of claim 2 wherein said plurality of caching levels include a distributed last caching level, a snoop-filter (SF), and a cache home agent (CHA).

6. The processor of claim 5 wherein said processing cores include respective hashing functions to direct all system memory addresses that map to a same near memory entry to a same last level cache slice.

7. The processor of claim 1 wherein said logic circuitry is to identify when a read request for a cache line having a system memory address that is different than said cache line but that still maps to a same near memory entry where a copy of said cache line resides, and, if said cache line is in an inclusive state, change said cache line's state to non-inclusive in response.

8. The processor of claim 7 wherein said logic circuitry marks all other cached cache lines that map to said same near memory entry as non-inclusive.

9. The processor of claim 1 wherein said logic circuitry is to cause said memory controller to perform a read of the near memory for all read requests to the system memory.

10. A method comprising:
    instructing a memory controller of a processor to read a cache line from a system memory having a near memory and a far memory;
    marking said cache line as one of an inclusive state and a non-inclusive state, said inclusive state indicating that a copy of said cache line exists in near memory, said non-inclusive state indicating that a copy of said cache line does not exist in said near memory;
    determining whether a write request for said cache line is generated remotely or generated locally;
    performing a read of the near memory before performing a write to a cache line targeted by the write request when the write request is generated remotely;
    performing a write to the cache line targeted by the write request without performing a read of the near memory when the write request is generated locally and the cache line targeted by the write request is in the inclusive state; and performing a read of the near memory before performing a write to the cache line targeted by the write request when the write request is generated locally and the cache line targeted by the write request is in the non-inclusive state.

11. The method of claim 10 further comprising recognizing that a read request for a second cache line has targeted said system memory, recognizing that said second cache line has a system memory address that is different than said cache line's system memory address, and recognizing that said system memory address of said second cache line maps to a same entry in said near memory where a copy of said cache line resides, and changing a state of said cache line to a non-inclusive state in response.

12. The method of claim 11 further comprising marking said second cache line as having an inclusive state.

13. The method of claim 12 further comprising marking all other cache lines that are cached in said processor and have a system memory address that maps to said same entry as having a non-inclusive state.

14. The method of claim 10 further comprising recognizing that a second read request for said cache line has targeted said system memory, and keeping a state of said cache line in the inclusive state in response.

15. The method of claim 10 further comprising receiving a remotely generated write request at said processor and instructing said memory controller to satisfy said remotely generated write request by performing a read of near memory before performing a write into said system memory.

16. A computing system comprising:
a system memory having a near memory and a far memory;
a processor comprising one or more processing cores;
a memory controller to interface with said system memory; and
logic circuitry to track state information of a cache line, said state information including a selected one of an inclusive state and a non-inclusive state, said inclusive state indicating that a copy of said cache line exists in near memory, said non-inclusive state indicating that a copy of said cache line does not exist in said near memory, said logic circuitry to cause said memory controller to determine whether a write request is generated remotely or generated locally, and when the write request is generated remotely, to instruct the memory controller to perform a read of the near memory before performing a write to a cache line targeted by the write request, when the write request is generated locally and the cache line targeted by the write request is in the inclusive state, to instruct the memory controller to perform a write to the cache line targeted by the write request without performing a read of the near memory, and when the write request is generated locally and the cache line targeted by the write request is in the non-inclusive state, to instruct the memory controller to perform a read of the near memory before performing a write to the cache line targeted by the write request.

17. The computing system of claim 16 further comprising a plurality of caching levels comprising a distributed last caching level and wherein said processing cores include respective hashing functions to direct all system memory addresses that map to a same near memory entry to a same last level cache slice.

18. The computing system of claim 16 wherein said logic circuitry is to identify when a read request for said cache line having a system memory address that is different than said cache line but that still maps to a same near memory entry where a copy of said cache line resides, and, if said cache line is in an inclusive state, change said cache line's state to non-inclusive in response.

19. The computing system of claim 18 wherein said logic circuitry marks all other cached cache lines that map to said same near memory entry as non-inclusive.

20. The computing system of claim 16 wherein said logic circuitry is to cause said memory controller to handle a write request that requests that a read of near memory be performed in response to said processor receiving a remotely generated write request.

21. The computing system of claim 16 wherein said logic circuitry is to cause said memory controller to perform a read of the near memory for all read requests to the system memory.

* * * * *